United States Patent
Im et al.

(10) Patent No.: US 7,324,412 B2
(45) Date of Patent: Jan. 29, 2008

(54) ACTUATOR USING FOCUSING-SUBSTRATE

(75) Inventors: Jang-Young Im, Gyeongsangnam-do (KR); Jeen-Gie Kim, Kyunggi-do (KR); Do-Sun Nam, Kyunggi-do (KR); Goo Hong, Kyunggi-do (KR); Young-Bok Yoon, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 629 days.

(21) Appl. No.: 10/804,613

(22) Filed: Mar. 19, 2004

(65) Prior Publication Data

US 2005/0180274 A1    Aug. 18, 2005

(30) Foreign Application Priority Data

Feb. 12, 2004    (KR) ............... 10-2004-0009330

(51) Int. Cl.
*G11B 7/00* (2006.01)

(52) U.S. Cl. .................. 369/44.15; 369/44.22
(58) Field of Classification Search .......... None
See application file for complete search history.

(56) References Cited

U.S. PATENT DOCUMENTS

2005/0060732 A1 *  3/2005  Kang et al. ............ 720/685

FOREIGN PATENT DOCUMENTS

| JP | 63129535 A | * | 6/1988 |
| JP | 06176386 A | * | 6/1994 |
| JP | 11306563 A | * | 11/1999 |
| KR | 1020030006588 A | | 1/2003 |

* cited by examiner

*Primary Examiner*—William R. Korzuch
*Assistant Examiner*—Jorge L. Ortiz-Criado
(74) *Attorney, Agent, or Firm*—Christensen O'Connor Johnson Kindness PLLC

(57) ABSTRACT

An actuator includes a focusing-substrate having a focusing coil pattern for generating focusing driving force, the focusing-substrate being provided with a land part and a hole through which laser beams pass, tracking coils for generating tracking driving force, the tracking coils being wound around opposite sides of the focusing substrate in parallel with the a wire direction, magnets for providing magnetic force to the focusing coil pattern and the tracking coils, and a yoke plate provided with a pair of first yokes for fixing the magnets.

3 Claims, 13 Drawing Sheets

ACTUATOR USING FOCUSING-SUBSTRATE

BACKGROUND OF THE INVENTION

1. Field of the Invention

The present invention relates to an actuator, and more particularly, to an actuator that can be designed in a compact size by using a substrate (hereinafter referred as "focusing-substrate") provided with a focusing coil pattern to maximize the space efficiency, and of which assembling process can be simplified. Further, the present invention relates to the actuator.

2. Description of the Related Art

Generally, an optical pickup actuator is used for a variety of optical players such as a mini disk player (MDP), a compact disk player (CDP), and a laser disk player (LDP). The optical pickup actuator is vertically disposed under an optical media such as a disk of the optical player to (a) detect a desire track location of the disk while linearly moving in a radial direction of the disk, (b) transmit laser light to a pit recorded on a surface of the disk at the detected track location, (c) detect reflection light received through an optical system, and (d) convert the detected reflection light into an electric signal so as for a user to listen to and/or watch sound and/or image data of the recorded pit through the optical players.

FIG. 1 schematically shows a conventional optical pickup device.

As shown in the drawing, a conventional optical pickup device 10 is installed on main and auxiliary shafts 3 and 5 that are provided on a deck panel 1 of an optical driver to record signals on an optical disk D or playback the signals recorded on the optical disk D while moving in a direction of a shaft axis.

The optical pickup device 10 includes a base 30 coupled on the main and auxiliary shafts 3 and 5 to reciprocally move along the direction of the shaft axis and an actuator 20 disposed on a top of the base 30 to converge incident light beams and focus the converged light beams on a point of the optical disk while moving together with the base 30.

FIG. 2 shows the actuator depicted in FIG. 1.

As shown in the drawing, the conventional optical pickup actuator 20 includes a blade 22 and an object lens 21 disposed on a top of the blade 22. Focusing and tracking coils 23 and 24 are wound such that the blade 22 can be minutely moving in focusing (vertical) and tracking (horizontal) directions. Magnets 27 for generating electromagnetic force and a yoke 28 are disposed in the vicinity of the focusing and tracking coils 23 and 24.

The blade 22 is elastically supported on a wire holder 26 by wires 25 horizontally extending in the tracking direction. That is, first ends of the wires 25 are fixed on both sides of the blade 22 by soldering and second ends thereof are fixed on the wire holder 26. By elastic force of the wires 25, the blade 22 can minutely move in the vertical and horizontal directions.

When electric power is applied to the coils 23 and 24 through the wires 25, the object lens 21 moves in the focusing or tracking directions by the electromagnetic force.

Such an actuator module using the coils is well known in the art. That is, in order to move the blade, the coils are used for generating Lorenz Force. When current is applied to the coils formed of a copper wire, Lorenz Force is generated by magnetic field formed by permanent magnets to move the blade in the vertical and horizontal directions. At this point, in order to adjust the motion in the vertical and horizontal directions, a plurality of coils are disposed together with the permanent magnets.

With electronic devices being small-sized, there has been a need of an actuator that can be applied to a small, slim electronic device. However, in the conventional actuator, since the coils are wound to be disposed on a side surface of the blade, there has been a limitation in reducing the size of the electronic device. Furthermore, since the conventional actuator is composed of many components, the manufacturing process is so complicated and a defective rate of the manufacture products is increased.

To solve the above problems, Korean Patent Application No. 2001-42407 discloses an actuator having a substrate (hereinafter referred as "Tracking-substrate") having a pattern corresponding to the tracking coil. Therefore, there is no need of installing the tracking coil, improving the productivity and reducing an overall thickness of a tracking part. That is, the actuator is helpful in reducing a device where it is employed.

FIG. 3 is an exploded perspective view of a conventional improved optical pickup actuator and FIG. 4 is a perspective view of a tracking-substrate depicted in FIG. 3.

Referring to FIG. 3, there is shown such a conventional improved actuator.

As shown in the drawing, the actuator includes focusing driving means and tracking driving means so that a blade 32 provided with an object lens 30 can move the object lens 30 in the focusing and tracking directions in response to focus of the optical beams.

The focusing driving means includes a focusing coil 34 to drive the blade 32 in a focusing direction with respect to a direction of an optical axis of the object lens 30. The tracking driving means includes a tracking-substrate 50 having a pattern corresponding to the tracking coil to drive the blade 32 in a tracking direction perpendicular to the focusing direction.

That is, the focusing coil 34 is wound around an outer circumference of the blade 32 to minutely move the object lens 30 in the focusing direction. The tracking-substrate 50 is formed to be flexible and attached on front and rear surfaces of the blade 32 to minutely move the object lens 30 in the tracking direction.

The tracking-substrate 50 includes a first tracking part 52 attached on the front surface of the blade 32, a second tracking part 54 attached on the rear surface of the blade 32, and a connecting part 56 for connecting the first tracking part 52 to the second tracking part 54.

At this point, it is preferable that a width of the connecting part 56 is less than those of the tracking parts 52 and 54. Formed on upper and bottom portions of the connecting part 56 are respectively soldering parts 58 and 59.

The first tracking part 52 is provided with first and second patterns 60 and 62 that are spaced at a predetermined interval. The second tracking part 54 is also provided with third and fourth patterns 64 and 66 that are spaced at a predetermined interval. All of patterns are interconnected by a single wire. That is, a coil extends from the upper soldering part 58 to the lower soldering part 59 while forming the first, second, third and fourth patterns 60, 62, 64 and 66.

Provided around the blade 32 are magnets 38 and a yoke 40 that generate electromagnetic force. The blade 32 is elastically supported on the wire holder 44 through wires 42. That is, first ends of two pairs of wires 42 are connected on each of first and second sides of the blade 32 and second ends of the two pairs of wires 42 are fixed on the wire holder 44. Therefore, the blade 32 can minutely moves by the elastic force of the wires 42 in vertical and horizontal directions.

The wires 42 of the first side of the holder 44 are earthed on a pattern formed on the soldering parts 58 and 59 of the tracking-substrate 50 to be connected to the blade 32. The wires 42 of the second side of the holder 44 are connected to the blade 32 through the focusing coil 34. When electric power is applied to the wire 42, current flows along the focusing coil 34 and the tracking-substrate 50. As a result, the actuator moves in a focusing or tracking direction by the electromagnetic force.

The operation of the above-described conventional actuator device will be described hereinafter.

When electric power is applied through the wire 42, current flows along the focusing coil 34 and the patterns of the tracking-substrate 50, generating electromagnetic force by which the blade 32 provided with the object lens 30 minutely moves in the vertical and horizontal directions. A moving distance and direction of the blade 32 can be adjusted by adjusting a current flowing direction.

According to the above-described actuator, since the tracking coil is not wound directly on the blade but the tracking-substrate 50 provided with a pattern defined in an identical shape to the conventional tracking coil is attached on the blade 32 as shown in FIG. 4, the assembling process can be simplified, saving the working time. That is, since a process for winding the tracking coil can be omitted, the number of overall processes can be reduced, improving the productivity, reducing the defective rate and saving the equipment costs for manufacturing the actuator.

Furthermore, the tracking-substrate 50 allows the overall thickness of the actuator to be reduced, resulting in reducing a gap between the magnets 38 and the yoke 40. That is, while the tracking coil has a 0.7-0.8 mm thickness, the tracking-substrate has a 0.2-0.3 mm thickness, reducing the gap by 0.4 mm.

According to the improved technique, since a process for winding the tracking coil can be omitted, the number of overall processes can be reduced, improving the productivity, reducing the defective rate and saving the equipment costs for manufacturing the actuator. Furthermore, the tracking substrate reduces the overall size of the actuator.

However, in order to provide reasonable tracking sensitivity, an effective length of the magnetic field of the tracking part should be higher than a predetermined length. Therefore, the tracking-substrate should be lengthened in a vertical direction, making it difficult to reduce the size of the actuator. Further more, since two pieces of the tracking-substrates are used, there is an limitation in reducing the manufacturing costs.

To solve the problems, a technique for forming the focus and tracking coil patterns on a single substrate has been proposed. However, in this case, a sufficient tracking sensitivity cannot be obtained.

That is, in order to obtain a sufficient tracking sensitivity, a thickness of the tracking coil pattern should be 0.7-0.8 mm. In this case, the manufacturing costs are increased.

SUMMARY OF THE INVENTION

Accordingly, the present invention is directed to an actuator deflection yoke that substantially obviate one or more problems due to limitations and disadvantages of the related art.

An object of the present invention is to provide an actuator that can be designed in a compact size by using a focusing-substrate provided with a focusing coil pattern to maximize the space efficiency.

To achieve the above object, the present invention provides an actuator comprising: a focusing-substrate having a focusing coil pattern for generating focusing driving force, the focusing-substrate being provided with a land part and a hole through which laser beams pass; an object lens for transmitting the laser beams; a blade for holding the object lens, the focusing substrate being fixed on a bottom of the blade; wire attaching parts formed on opposite sides of the blade and connected to the land part; a PCB for applying external current to the focusing coil pattern; wires having first end fixed on the wire attaching parts and second ends fixed on the PCB; tracking coils for generating tracking driving force by receiving current from the PCB, the tracking coils being wound around opposite sides of the focusing substrate in parallel with the a wire direction; magnets for providing magnetic force to the focusing coil pattern and the tracking coils; and a yoke plate provided with a pair of first yokes for fixing the magnets and a second yoke for fixing the PCB.

In another aspect of the present invention, there is provided an actuator comprising a focusing-substrate having a focusing coil pattern for generating focusing driving force, the focusing-substrate being provided with a land part and a hole through which laser beams pass; an object lens for transmitting the laser beams; a blade for holding the object lens, the focusing substrate being fixed on a bottom of the blade; wire attaching parts formed on opposite sides of the blade and connected to the land part; a PCB for applying external current to the focusing coil pattern; wires having first end fixed on the wire attaching parts and second ends fixed on the PCB; tracking coils for generating tracking driving force by receiving current from the PCB, the tracking coils being formed on outer circumferences of the blade and the focusing-substrate; magnets for providing magnetic force to the focusing coil pattern and the tracking coils; and a yoke plate provided with a pair of outer yokes for fixing the magnets and a second yoke for fixing the PCB.

In still another aspect of the present invention, there is provided an actuator comprising a focusing-substrate having a focusing coil pattern for generating focusing driving force, the focusing-substrate being provided with a land part, a hole through which laser beams pass, first and second right hook grooves, first and second middle hook grooves, and first and second left hook grooves; an object lens for transmitting the laser beams; a blade for holding the object lens, the focusing substrate being fixed on a bottom of the blade; wire attaching parts formed on opposite sides of the blade and connected to the land part; a PCB for applying external current to the focusing coil pattern; wires having first end fixed on the wire attaching parts and second ends fixed on the PCB; tracking coils for generating tracking driving force by receiving current from the PCB, the tracking coils being wound around first, second, third and fourth portions of the focusing-substrate that are defined between the left, middle and right hook portions; magnets for providing magnetic force to the focusing coil pattern and the tracking coils; and a yoke plate provided with a pair of first yokes for fixing the magnets and a second yoke for fixing the PCB.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
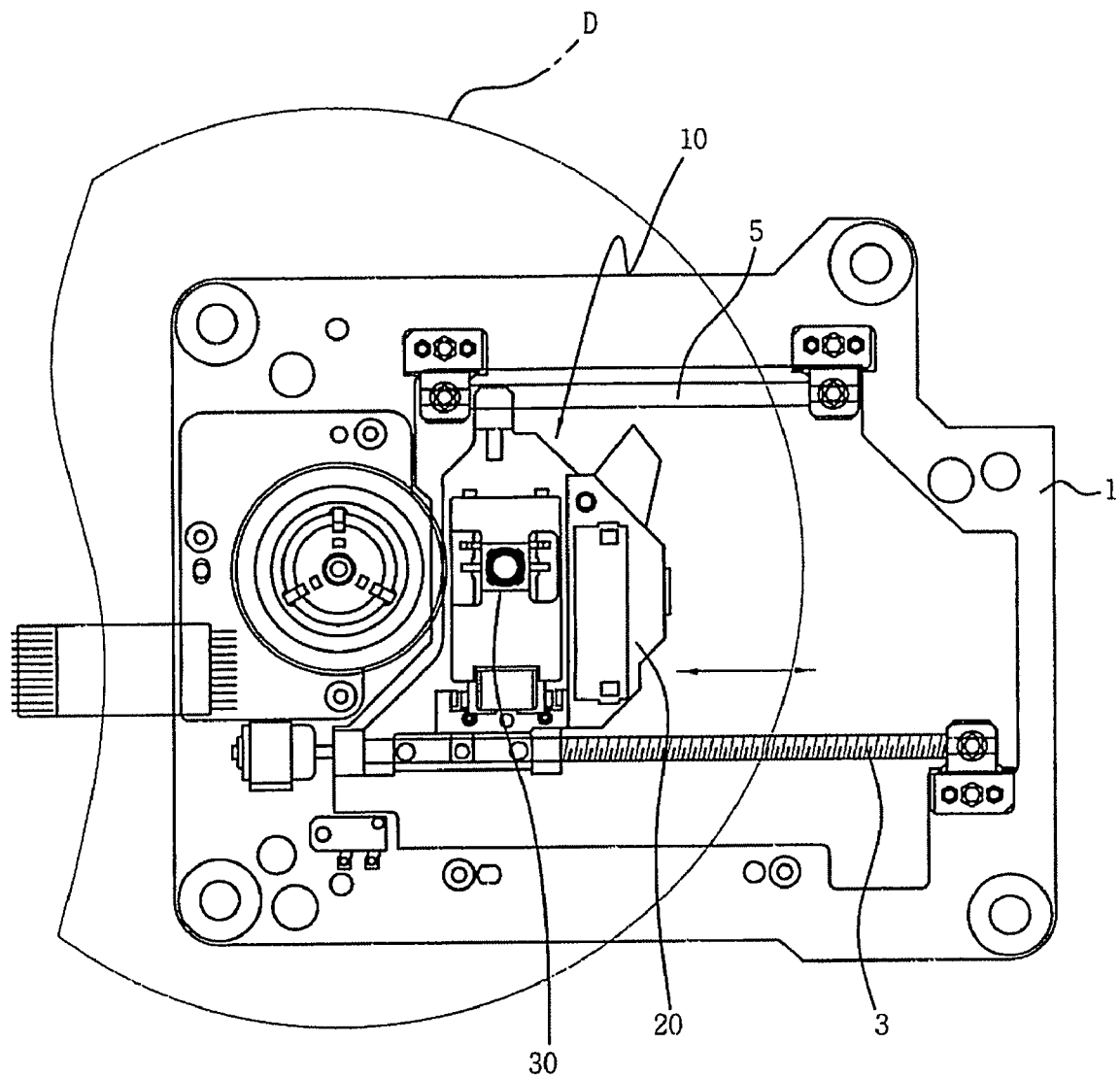
FIG. 1 is a schematic view of a conventional optical pickup device.
Figure 2:
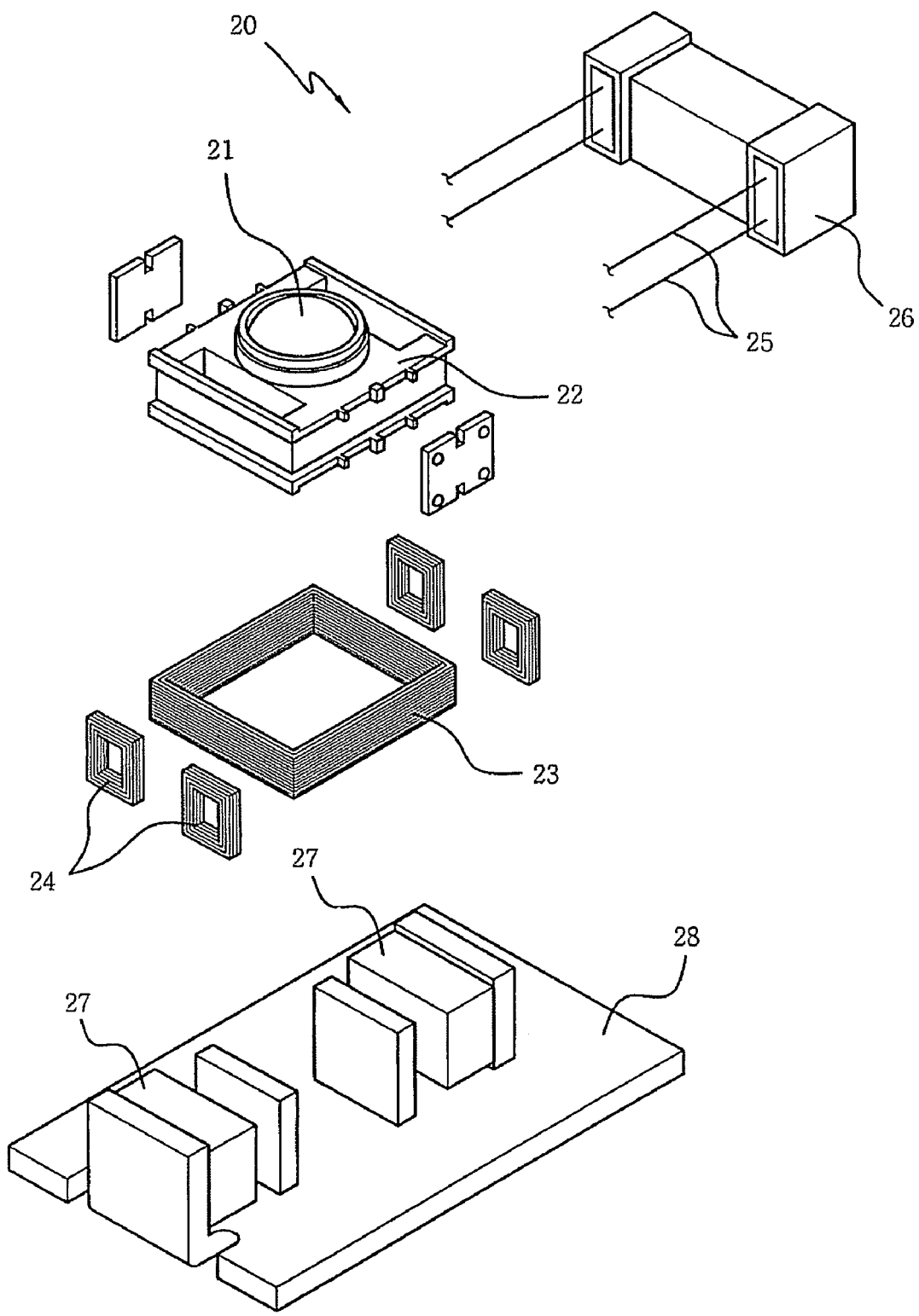
FIG. 2 is an exploded perspective view of an optical pickup actuator depicted in FIG. 1.
Figure 3:
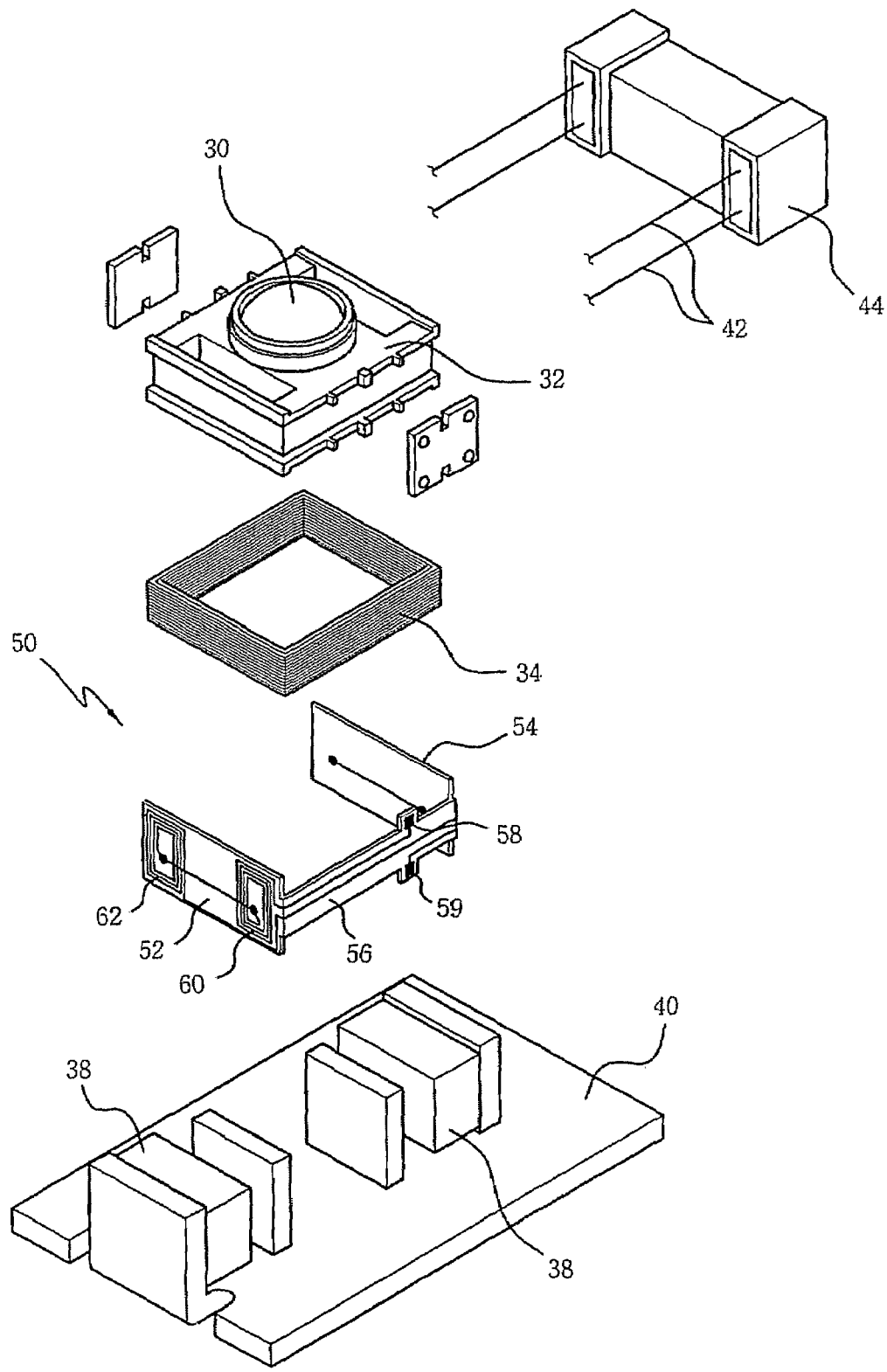
FIG. 3 is an exploded perspective view of an conventional improved optical pickup actuator.
Figure 4:
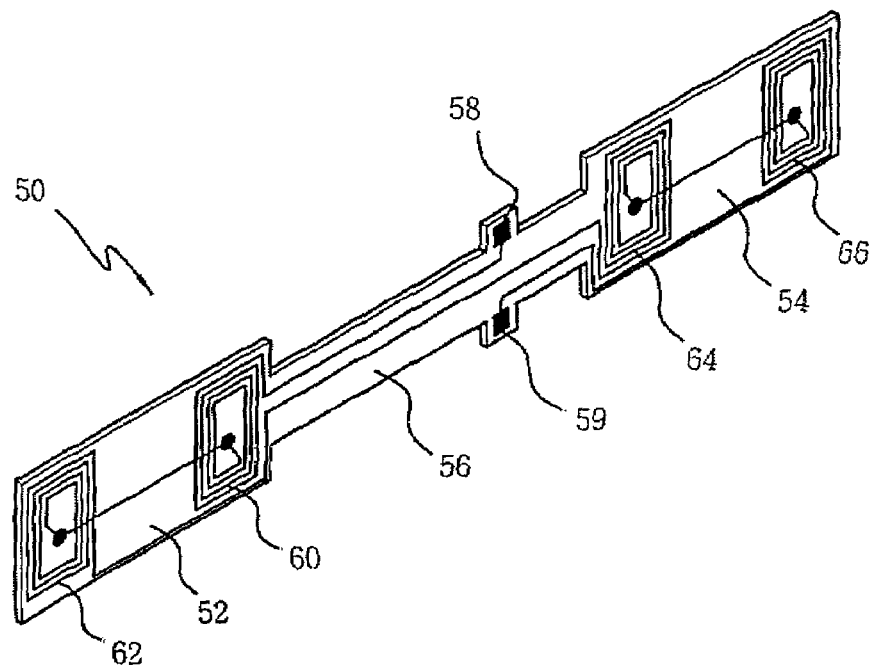
FIG. 4 is a perspective view of a tracking-substrate depicted in FIG. 3.
Figure 5:
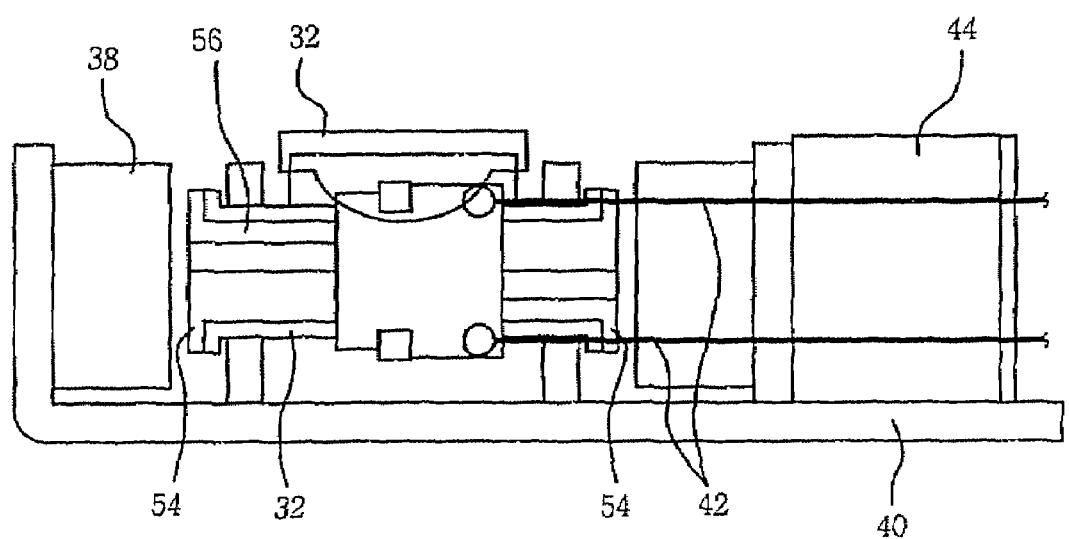
FIG. 5 is a side view of an assembled tracking-substrate depicted in FIG. 3.
Figure 6:
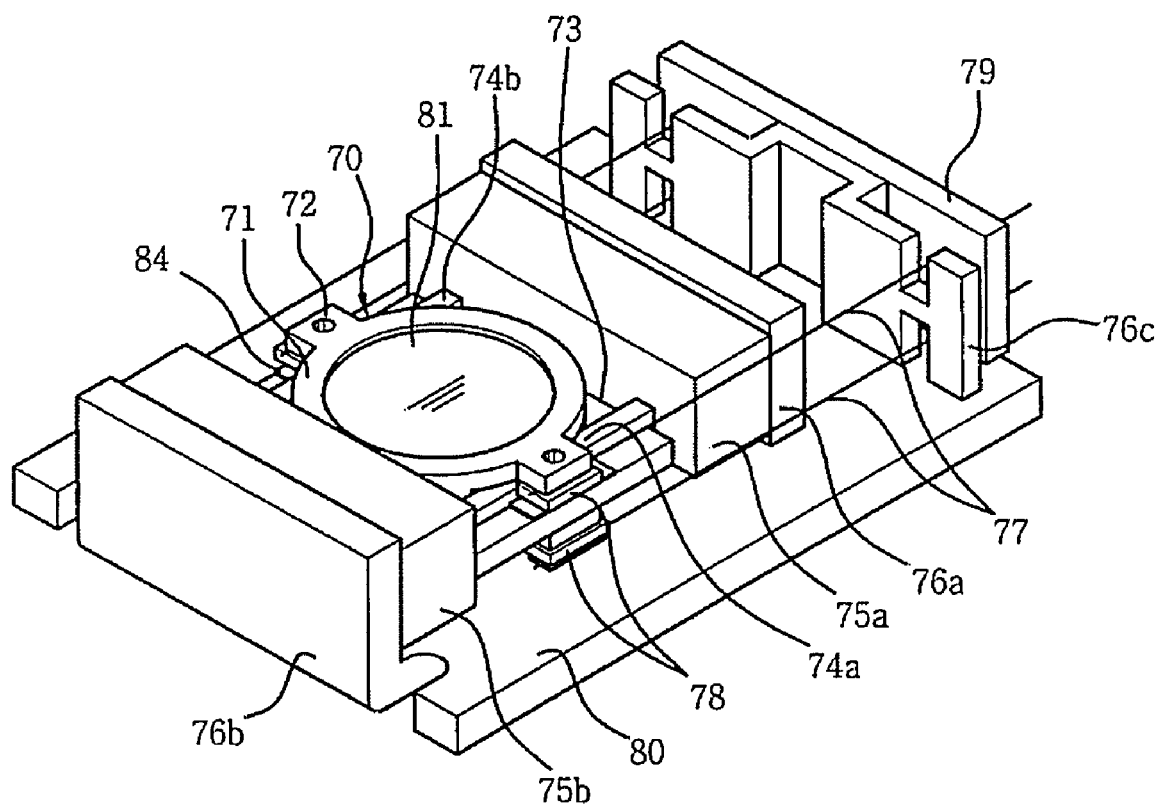
FIG. 6 is a perspective view of an actuator using a focusing-substrate according to an embodiment of the present invention.
Figure 7:
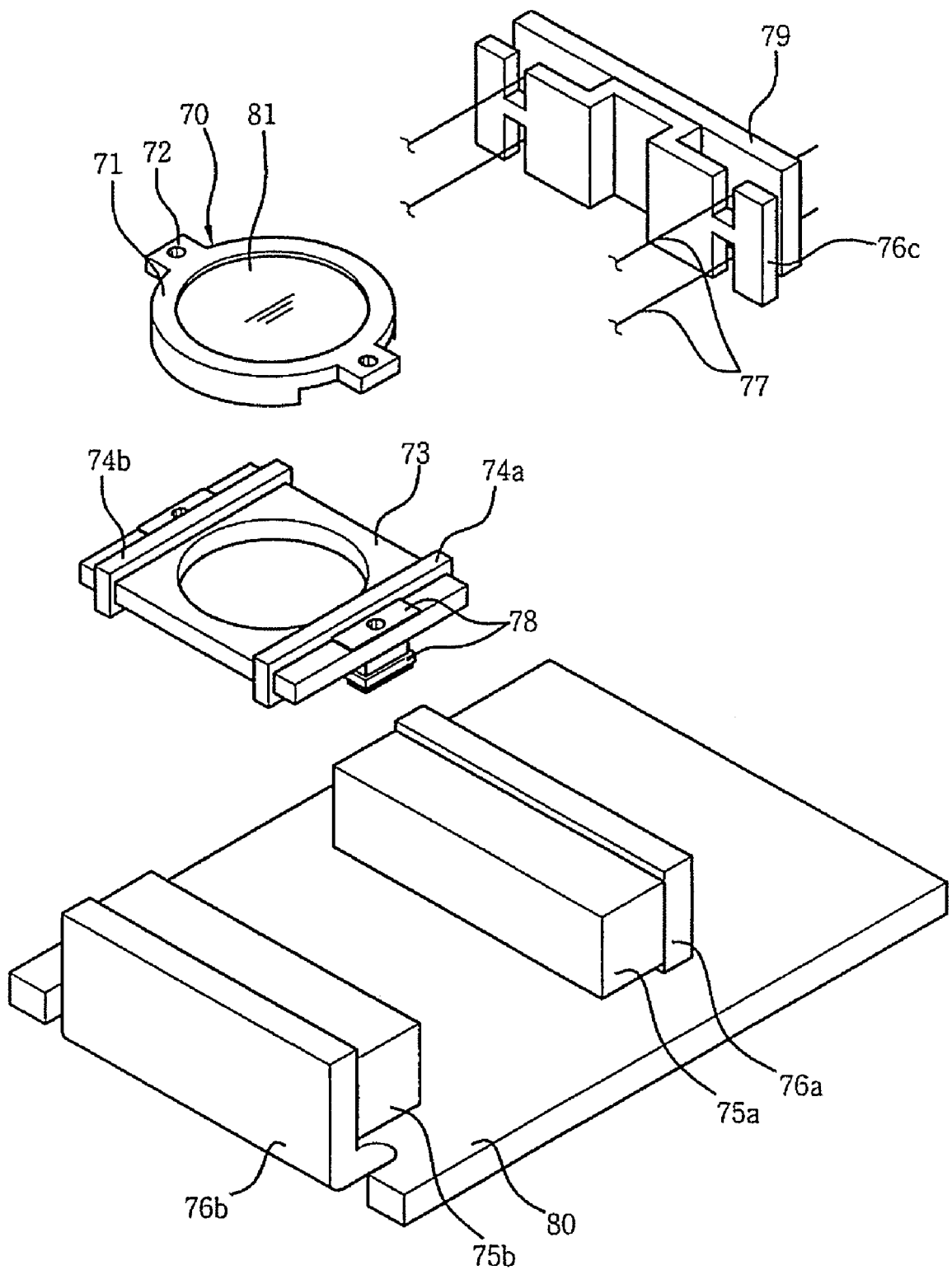
FIG. 7 is an exploded perspective view of an actuator using a focusing-substrate according to an embodiment of the present invention.

FIGS. 6 and 7 are respectively a schematic view and exploded perspective view of an actuator using a focusing-substrate according to an embodiment of the present invention.

As shown in the drawings, an actuator of this embodiment comprises a blade 70 having a lens holder 71 and a pair of fixing parts 72, a focusing-substrate 73 provided with a patterned focusing coil, a tracking coil 74 for providing tracking driving force, magnets 75a and 75b and yokes 76a and 76b for generating electromagnetic force, wires 77 for supplying electric power, wire attaching parts 78 for fixing first ends of the wires 77, a PCB 79 for providing vertical and horizontal motions of the blade 70 by fixing second ends of the wires 77, and a yoke plate 80 for supporting the magnets 75a and 75b, the yokes 76a, 76b and 76c, and the PCB 79.

The lens holder 71 is formed in a circular shape and disposed on a central portion of the blade 70 to fix the object lens 81 at the central portion. The pair of fixing parts 72 are provided on opposing ends of the blade 70 to vertically move the object lens using focusing driving force generated by the focusing coil pattern of the focus-substrate 73.

The object lens 81 is fixed on the lens holder 71 of the blade 70 to allow incident or reflected laser beams to transmit therethrough.

The focusing coil is patterned in a single or multiple step on the focusing-substrate 73 and is supplied with current through the wires 77 to generate the focusing driving force by being affected by the electromagnetic force of the magnets 75a and 75b.

That is, the magnetic field is generated around the magnets, and at this point, when current is applied to the focusing coil pattern disposed in the magnetic field, the focusing coil pattern generates Lorenz force in a vertical direction according to Fleming's left hand rule.

Figure 8:
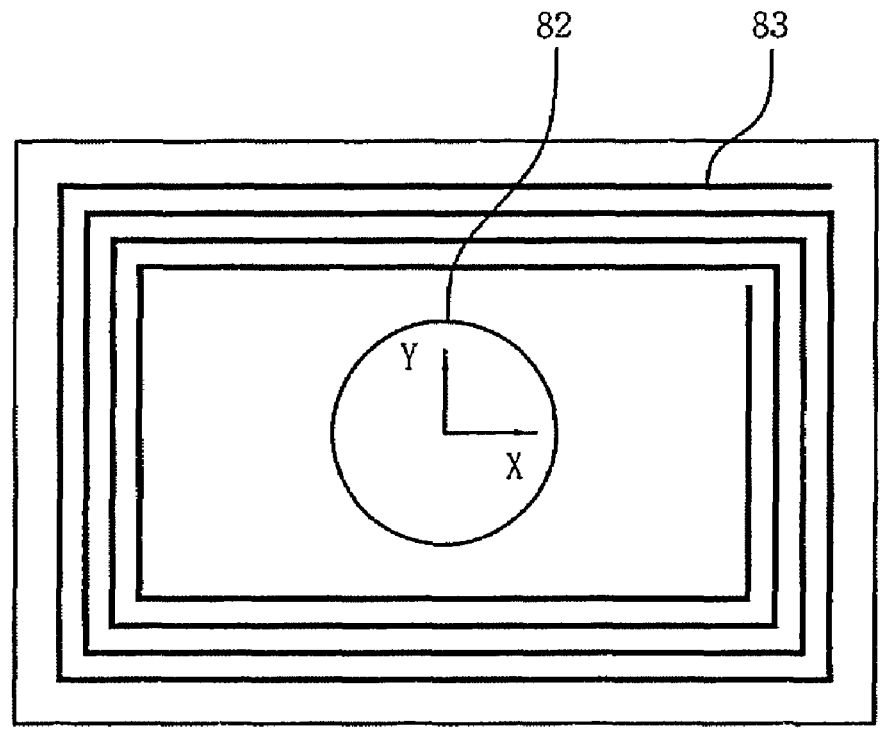
FIG. 8 is an upper sectional view of a focusing-substrate depicted in FIG. 6 according to an embodiment of the present invention.

FIG. 8 shows the focusing-substrate 73 provided with the focusing coil pattern 83. The focusing coil pattern 83 is formed using a technology for manufacturing a printed circuit board. The focusing-substrate 73 is provided at a center portion with a hole 82 through which the laser beams incident through the object lens 81 can pass.

The focusing coil pattern 83 is coiled in a rectangular shape to generate force when current is applied thereto. The direction of the force is converted in response to the current flow direction. The focusing coil pattern 83 can be coiled in a spiral shape, etc.

According to the coiled shape of the focusing coil pattern 83, the shape and intensity of the electric field may be varied. Although the coiled shape of the focusing coil pattern 83 can be formed in a variety of shape, it should be careful that Lorenz force generated by the coil pattern is not compensated for.

In FIG. 8, although the focusing coil pattern 83 is formed in a single step, it will be preferable that it is formed in a multiple step, more preferably, in four steps in a variety of respects such as cost.

Figure 9:
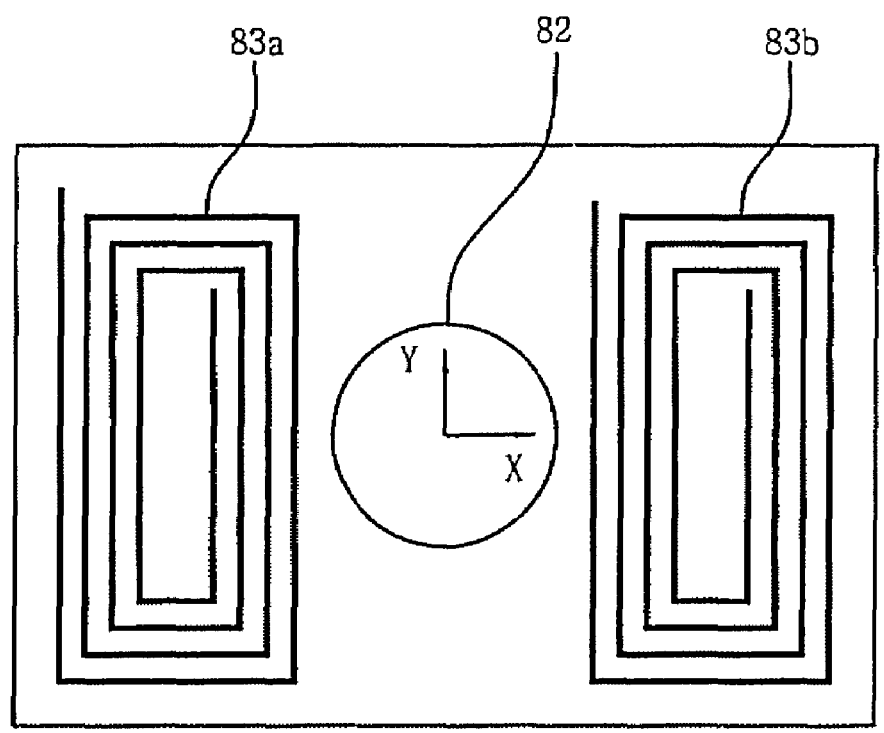
FIG. 9 is an upper sectional view of a focusing-substrate depicted in FIG. 6 according to a modified example of the present invention.

FIG. 9 shows a modified example of the focusing-substrate that can be used for the actuator depicted in FIG. 6.

A focusing-substrate of this embodiment is provided with a central hole 82 both sides of which focusing coil patterns 83a and 83b are formed.

Each of the focusing coil patterns 83a and 83b is formed by coil coiled in a rectangular shape to generate force when current is applied thereto. The direction of the force is converted in response to the current flow direction. The focusing coil patterns 83a and 83b can be coiled in a spiral shape.

According to the coiled shape of the focusing coil patterns 83a and 83b, the shape and intensity of the electric field may be varied. Although the coiled shape of the focusing coil patterns 83a and 83b can be formed in a variety of shape, it should be careful that Lorenz force generated by the coil pattern is not compensated for.

In FIG. 9, although the focusing coil patterns 83a and 83b are formed in a single step, it will be preferable that they are formed in a multiple step, more preferably, four steps in a variety of respects such as cost.

At this point, the right and left focusing coil patterns 83a and 83b and the left and right focusing coil patterns 83b and 83a have the identical current flow direction with respect to the left or right side surface of the printed circuit board so as not to compensate for Lorenz force.

Referring again FIG. 6, the pair of tracking coils 74a and 74b are wound at opposite end of the focusing-substrate 73 in parallel with a wire direction. When the current is applied to the tracking coils 74a and 74b, they generate Lorenz force in the horizontal direction by the magnetic field generated by the magnets 75a and 75b.

That is, the magnetic field is generated around the magnets 75, and at this point, when current is applied to the tracking coils 74a and 74b in the magnetic field, the tracking coils 74a and 74b generate Lorenz force in a vertical direction according to Fleming's left hand rule.

The pair of yokes 76a and 76b are symmetrically formed on the yoke plate 80. The magnets 75a and 75b are also formed on the yoke plate 80 to generate the electromagnetic force by applying flux to the tracking coils 74a and 74b and the focusing-substrate 73.

The second yoke 76c is formed on an edge of the yoke plate 80 and the PCB 79 is fixed on the second yoke 76c by a screw. The first ends of the wires 77 are fixed on the wire attaching parts 72 formed on the blade 70 by soldering. The second ends of the wires 77 are earthed on the PCB 79. Therefore, the blade 70 is suspended by the wires 77, and the current applied to the PCB 79 from a signal processor (not shown) is transmitted to land parts 84 through the tracking coils 74a and 74b and the focusing-substrate 73.

The PCB 79 applies the current to the wire 77 so that the current applied to the PCB 79 from a signal processor can be transmitted to the land part 84 through the tracking coils 74a and 74b and the focusing-substrate 73. The PCB 79 fixes the second ends of the wires 77 such that the blade 70 can minutely move in the vertical direction by the elastic force of the wires 77.

The wires 77 are supported at their second ends by the PCB 79 fixed on the yoke plate 80 to allow the current applied to the PCB 79 from a signal processor to be transferred to the tracking coils 74a and 74b and the focusing-substrate 73. At this point, the space of the wires 77 should be sufficient so that no short circuit is incurred therebetween.

The wire attaching parts 78 are formed under the fixing parts 72 for fixing the focusing-substrate 73 of the blade 70. The first ends of the wires 77 are fixed on the wire attaching parts 78 by soldering.

The land parts 84 of the focusing-substrate 73 are provided to electrically connect the focusing coil pattern to an external side. That is, since the land parts 84 are connected to the wire attaching parts 78 by soldering, they can maintain the electrical connection with the wires 77.

Figure 10:
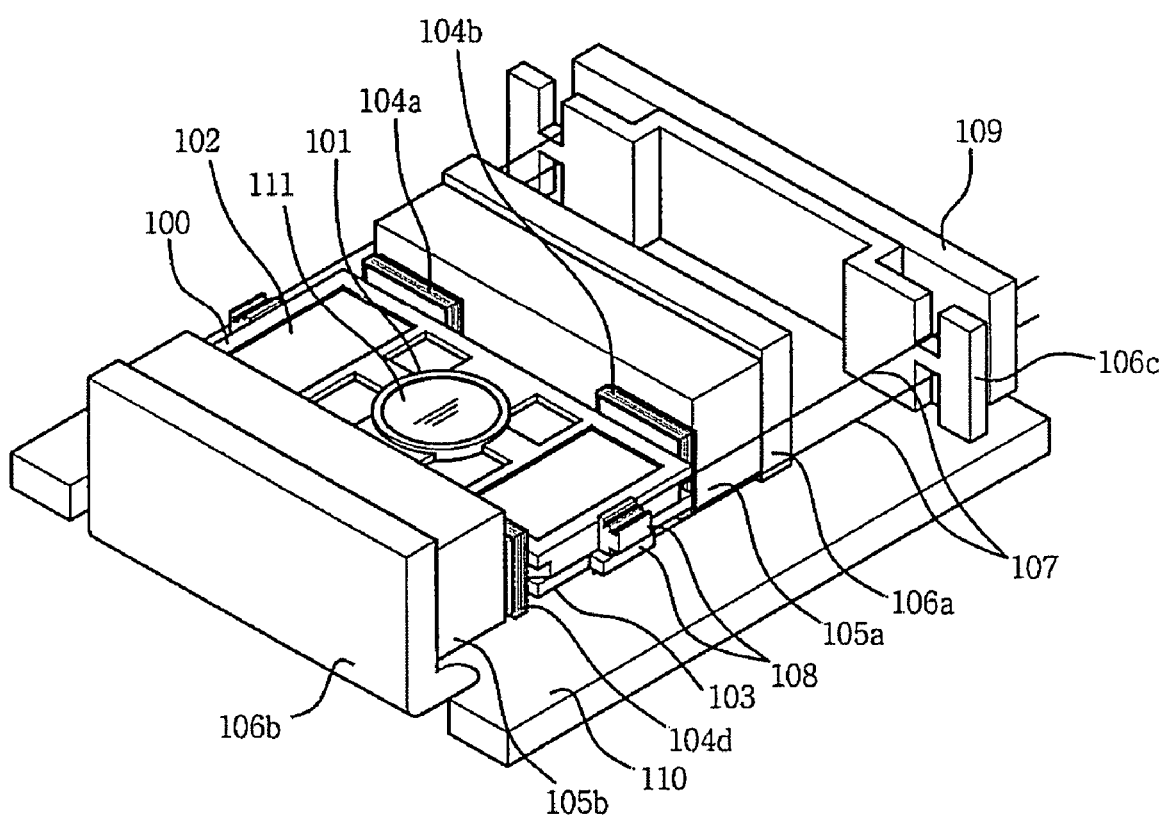
FIG. 10 is a perspective view of an actuator using a focusing-substrate according to another embodiment of the present invention.
Figure 11:
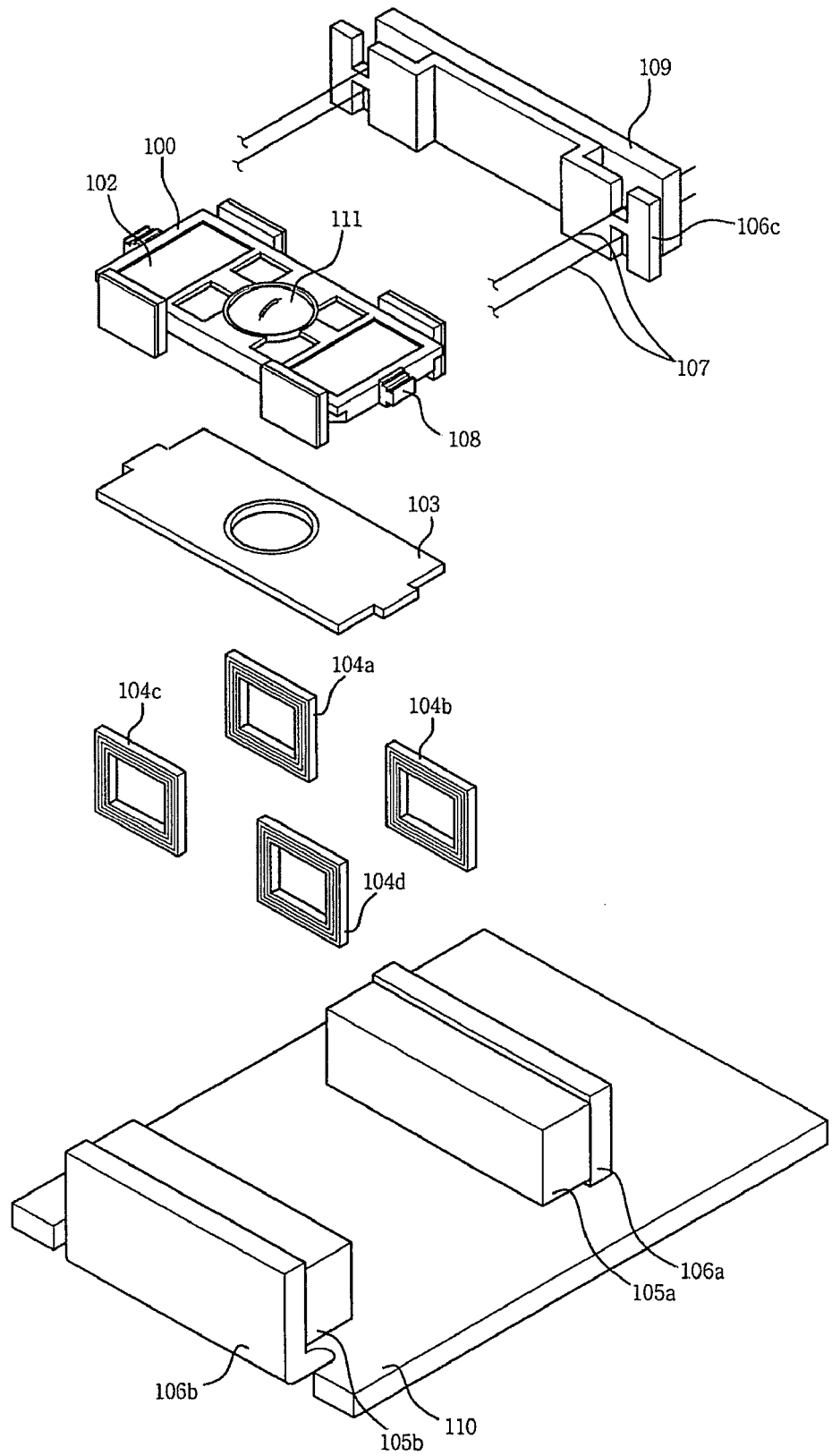
FIG. 11 is an exploded perspective view of an actuator using a focusing-substrate according to another embodiment of the present invention.

FIGS. 10 and 11 are respectively a perspective and exploded perspective views of an actuator using a focusing-substrate according to another embodiment of the present invention.

As shown in the drawings, an actuator of this embodiment comprises a blade 100 having a lens holder 101, a focusing-substrate 103 provided with a focusing coil pattern, tracking coils 104a, 104b, 104c, and 104d for providing tracking driving force, magnets 105a and 105b for generating electromagnetic force, wires 107 for supplying electric power, wire attaching parts 108 for fixing first ends of the wires 107, a PCB 109 for providing vertical and horizontal motions of the blade 100 by fixing second ends of the wires 107, and a yoke plate 110 for supporting the magnets 105a and 105b, yokes 106a, 106b and 106c, and the PCB 109.

The lens holder 101 is formed in a circular shape and disposed on a central portion of the blade 100 to fix the object lens 111 at the central portion. The blade 100 further includes a rectangular flat base 102 for fixing the focusing-substrate 103.

The first ends of the wires 107 are fixed on the wire attaching parts 108 formed on opposite side ends of the blade 100.

The focusing coil is patterned in a single or multiple step on the focusing-substrate-103 and is supplied with current through the wires 107 to generate the focusing driving force by being affected by the electromagnetic force of the magnets 105a and 105b.

That is, the magnetic field is generated around the magnets, and at this point, when current is applied to the focusing coil pattern disposed in the magnetic field, the focusing coil pattern generates Lorenz force in a vertical direction according to Fleming's left hand rule. The shape of the focusing coil pattern of the focusing-substrate can be properly selected from the shapes depicted in FIGS. 8 and 9.

The focusing-substrate 103 is disposed under the blade 100 and attached on the flat base 102 of the blade 100.

The plurality of tracking coils 104a, 104b, 104c, and 104d are provided on opposite sides of the focusing-substrate 103. When the current is applied to the tracking coils 104a, 104b, 104c, and 104d, they generate Lorenz force in the horizontal direction by magnetic field generated by the magnets 105a and 105b.

That is, the magnetic field is generated around the magnets 105a and 105b, and at this point, when current is applied to the tracking coils 104a, 104b, 104c, and 104d disposed in the magnetic field, the tracking coils 104a, 104b, 104c, and 104d generate Lorenz force in a vertical direction according to Fleming's left hand rule.

The pair of yokes 106a and 106b are symmetrically formed on the yoke plate 110. The magnets 105a and 105b are also formed on the yoke plate 110 to generate the electromagnetic force by applying flux to the tracking coils 104a, 104b, 104c, and 104d and the focusing-substrate 103.

The second yoke 106c is formed on an edge of the yoke plate 110 and the PCB 109 is fixed on the second yoke 106c by a screw. The first ends of the wires 107 are fixed on the wire attaching parts 108 formed on the blade 100 by soldering. The second ends of the wires 107 are earthed on the PCB 109. Therefore, the blade 100 is suspended by the wires 107, and the current applied to the PCB 79 from a signal processor (not shown) is transmitted to the tracking coils 104a, 104b, 104c, and 104d and the focusing-substrate 103 through the wires 107.

The wire attaching parts 108 are formed on the opposite surfaces of the blade 100 and the first ends of the wires 107 are fixed on the wire attaching parts 108 by soldering.

The land part (not shown) of the focusing-substrate 103 is provided to electrically connect the focusing coil pattern to an external side. That is, the land part is connected to the wire attaching parts 108 to direct the current received from the wires to the focusing coil pattern.

Figure 12:
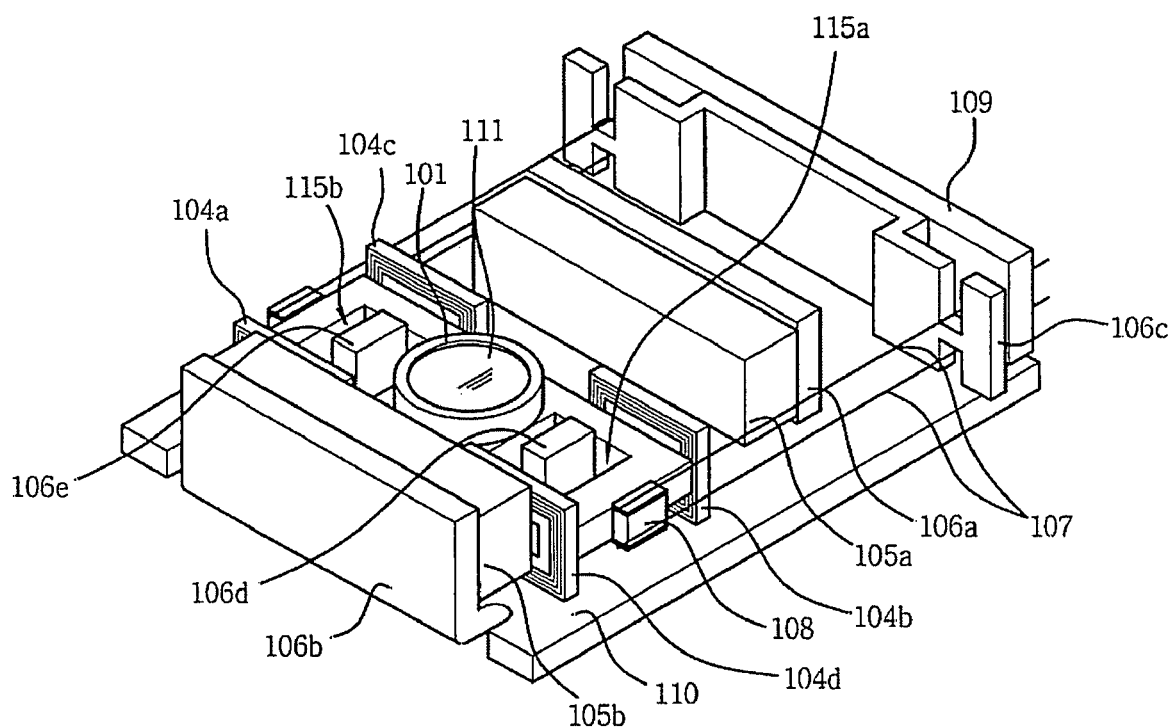
FIG. 12 is a perspective view of an actuator using a focusing-substrate according to another embodiment of the present invention.
Figure 13:
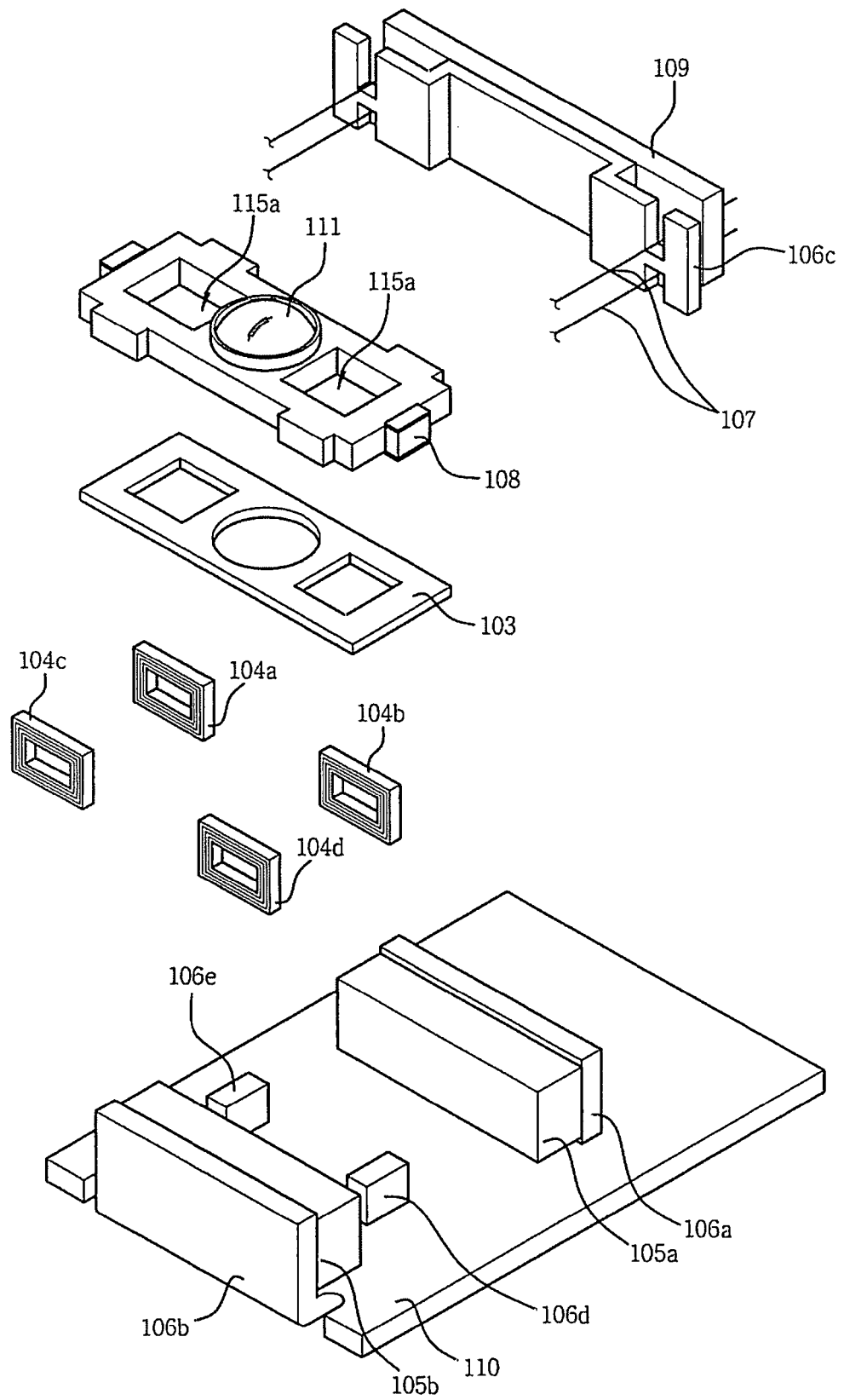
FIG. 13 is an exploded perspective view of an actuator using a focusing-substrate according to another embodiment of the present invention.

FIGS. 12 and 13 are respectively a perspective and exploded perspective views of an actuator using a focusing-substrate according to another embodiment of the present invention.

As shown in the drawings, an actuator of this embodiment comprises a blade 100 having a lens holder 101, a focusing-substrate 103 provided with a focusing coil pattern, tracking coils 104a, 104b, 104c, and 104d for providing tracking driving force, magnets 105a and 105b for generating electromagnetic force, wires 107 for supplying electric power, wire attaching parts 108 for fixing first ends of the wires 107, a PCB 109 for providing vertical and horizontal motions of the blade 100 by fixing second ends of the wires 107, and a yoke plate 110 for supporting the magnets 105a and 105b, outer yokes 106a, 106b, inner yokes 106d and 106e, a second yoke 106c, and the PCB 109.

The lens holder 101 is formed in a circular shape and disposed on a central portion of the blade 100 to fix the object lens 111 at the central portion. The blade 100 is provided with a pair of holes 115a and 115b through which the inner yokes 106d and 106e symmetrically disposed between the outer yokes 106a and 106b on the yoke plate 110 are projected, respectively. The blade 100 further includes a rectangular flat base 102 for fixing the focusing-substrate 103.

The first ends of the wires 107 are fixed on the wire attaching parts 108 formed on opposite side ends of the blade 100.

The focusing coil is patterned in a single or multiple step on the focusing-substrate 103 and is supplied with current through the wires 107 to generate the focusing driving force by being affected by the electromagnetic force of the magnets 105a and 105b.

That is, the magnetic field is generated around the magnets, and at this point, when current is applied to the focusing coil pattern disposed in the magnetic field, the focusing coil pattern generates Lorenz force in a vertical direction according to Fleming's left hand rule. The shape of the focusing coil pattern of the focusing-substrate can be properly selected from the shapes depicted in FIGS. 8 and 9.

The focusing-substrate 103 is provided with a pair of holes corresponding to the holes 115a and 115b so that the inner yokes 106d and 106e can pass therethrough, respectively. The focusing-substrate 103 is further provided with a hole 112 through which the laser beam passing through the object lens can pass.

The focusing-substrate 103 is disposed under the blade 100 and attached on the flat base 102 of the blade 100.

The plurality of tracking coils 104a, 104b, 104c, and 104d are provided on opposite sides of the focusing-substrate 103. When the current is applied to the tracking coils 104a, 104b, 104c, and 104d, they generate Lorenz force in the horizontal direction by magnetic field generated by the magnets 105a and 105b.

That is, the magnetic field is generated around the magnets 105a and 105b, and at this point, when current is applied to the tracking coils 104a, 104b, 104c, and 104d disposed in the magnetic field, the tracking coils 104a, 104b, 104c, and 104d generate Lorenz force in a vertical direction according to Fleming's left hand rule.

The pair of outer yokes 106a and 106b are symmetrically formed on the yoke plate 110. The magnets 105a and 105b are also formed on the yoke plate 110 to generate the electromagnetic force by applying flux to the tracking coils 104a, 104b, 104c, and 104d and the focusing-substrate 103.

In addition, the inner yokes 106d and 106e are formed on the yoke plate 100 between the outer yokes 106a and 106b to induce the flux of the magnets 106a and 106b. As a result, a magnetic lock out circuit where the flux of the magnets 106a and 106b intensively passes through the tracking coils 104a, 104b, 104c and 104d and the focusing-substrate 103 in the horizontal direction and returns to the magnet through the inner yokes 106d and 106e and the yoke plate 110 is realized.

The second yoke 106c is formed on an edge of the yoke plate 110 and the PCB 109 is fixed on the second yoke 106c by a screw. The first ends of the wires 107 are fixed on the wire attaching parts 108 formed on the blade 100 by soldering. The second ends of the wires 107 are earthed on the PCB 109. Therefore, the blade 100 is suspended by the wires 107, and the current applied to the PCB 79 from a signal processor (not shown) is transmitted to the tracking coils 104a, 104b, 104c, and 104d and the focusing-substrate 103 through the wires 107.

The wire attaching parts 108 are formed on the opposite surfaces of the blade 100 and the first ends of the wires 107 are fixed on the wire attaching parts 108 by soldering.

The land part (not shown) of the focusing-substrate 103 is provided to electrically connect the focusing coil pattern to an external side. That is, the land part is connected to the wire attaching parts 108 to direct the current received from the wires to the focusing coil pattern.

Figure 14:
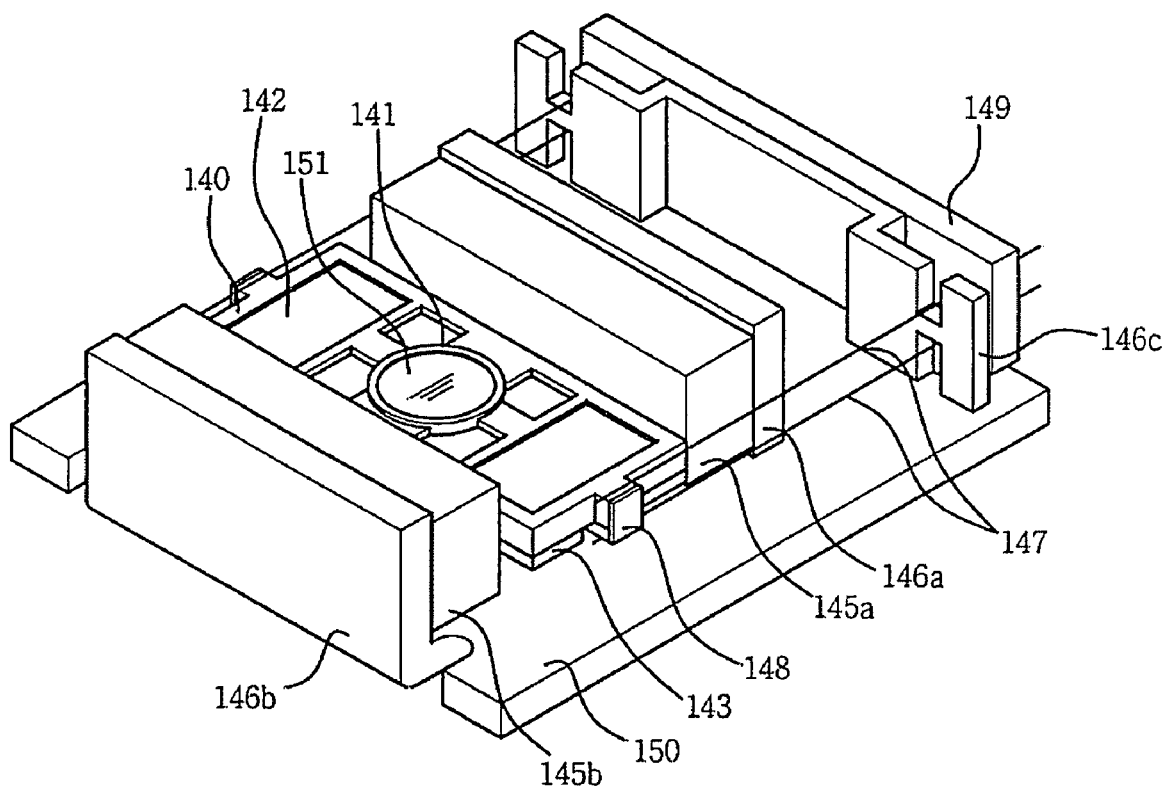
FIG. 14 is a perspective view of an actuator using a focusing-substrate according to another embodiment of the present invention.
Figure 15:
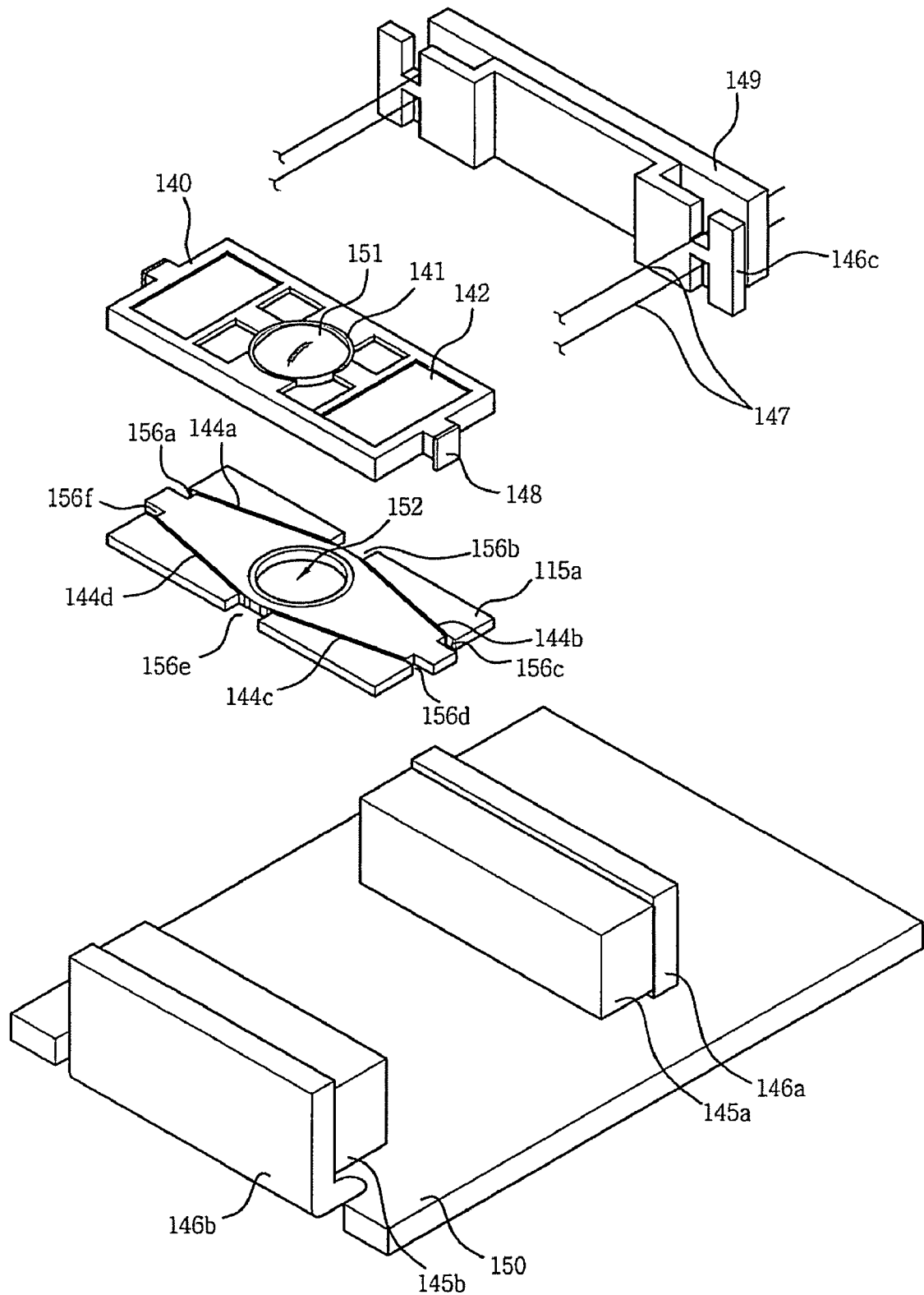
FIG. 15 is an exploded perspective view of an actuator using a focusing-substrate according to another embodiment of the present invention.

FIGS. 14 and 15 are respectively a perspective and exploded perspective views of an actuator using a focusing-substrate according to another embodiment of the present invention.

As shown in the drawings, an actuator of this embodiment comprises a blade 140 having a lens holder 141, a focusing-substrate 143 provided with a focusing coil pattern, tracking coils 144a, 144b, 144c, and 144d for providing tracking driving force, magnets 145a and 145b for generating electromagnetic force, wires 147 for supplying electric power, wire attaching parts 148 for fixing first ends of the wires 147, a PCB 149 for providing vertical and horizontal motions of the blade 140 by fixing second ends of the wires 147, and a yoke plate 150 for supporting the magnets 145a and 145b, yokes 146a and 146b, a second yoke 146c, and the PCB 149.

The lens holder 151 is formed in a circular shape and disposed on a central portion of the blade 140 to fix the object lens 151 at the central portion. The blade 140 further includes a rectangular flat base 142 for fixing the focusing-substrate 143.

The first ends of the wires 147 are fixed on the wire attaching parts 148 formed on opposite side ends of the blade 140.

The focusing coil is patterned in a single or multiple step on the focusing-substrate 143 and is supplied with current through the wires 107 to generate the focusing driving force by being affected by the electromagnetic force of the magnets 105a and 105b.

That is, the magnetic field is generated around the magnets, and at this point, when current is applied to the focusing coil pattern disposed in the magnetic field, the focusing coil pattern generates Lorenz force in a vertical direction according to Fleming's left hand rule. The shape of the focusing coil pattern of the focusing-substrate can be properly selected from the shapes depicted in FIGS. 8 and 9.

The focusing-substrate 143 is provided with a hole 152 corresponding to the object lens 151.

The focusing-substrate 143 is disposed under the blade 140 and attached on the flat base 142 of the blade 140.

The focusing-substrate 143 is provided with right hook grooves 156a and 156f, middle hook grooves 165b and 156e, and left hook grooves 156c and 156d. The plurality of tracking coils 144a, 144b, 144c, and 144d are wound around the hook grooves.

That is, the first tracking coil 144a is wound around a portion defined between the middle hook groove 156b and the right hook groove 156a, the second tracking coil 144b is wound around a portion defined between the middle hook groove 156b and the left hook groove 156c, the third tracking coil 144*c* is wound around a portion defined between the middle hook groove 156*e* and the left hook groove 156*d*, and the fourth tracking coil 144*d* is wound around a portion defined between the middle hook groove 156*e* and the right hook groove 156*f*.

When the current is applied to the tracking coils 144*a*, 144*b*, 144*c*, and 144*d*, they generate Lorenz force in the horizontal direction by magnetic field generated by the magnets 145*a* and 145*b*.

That is, the magnetic field is generated around the magnets 145*a* and 145*b*, and at this point, when current is applied to the tracking coils 144*a*, 144*b*, 144*c*, and 144*d* disposed in the magnetic field, the tracking coils 74*a* and 74*b* generate Lorenz force in a vertical direction according to Fleming's left hand rule.

The pair of yokes 146*a* and 146*b* are symmetrically formed on the yoke plate 150. The magnets 145*a* and 145*b* are also formed on the yoke plate 150 to generate the electromagnetic force by applying flux to the tracking coils 144*a*, 144*b*, 144*c*, and 144*d* and the focusing-substrate 143.

The second yoke 146*c* is formed on an edge of the yoke plate 150 and the PCB 149 is fixed on the second yoke 146*c* by a screw. The first ends of the wires 107 are fixed on the wire attaching parts 148 formed on the blade 140 by soldering. The second ends of the wires 147 are earthed on the PCB 149. Therefore, the blade 140 is suspended by the wires 147, and the current applied to the PCB 149 from a signal processor (not shown) is transmitted a land part of the tracking coils 144*a*, 144*b*, 144*c*, and 144*d* and the focusing-substrate 143 through the wires 147.

The wire attaching parts 148 are formed on the opposite surfaces of the blade 140 and the first ends of the wires 147 are fixed on the wire attaching parts 148 by soldering.

The land part (not shown) of the focusing-substrate 143 is provided to electrically connect the focusing coil pattern to an external side. That is, the land part is connected to the wire attaching parts 148 to direct the current received from the wires 147 to the focusing coil pattern.

As described above, according to the present invention, the actuator can be designed to be compact, saving the space. That is, the actuator of the present invention can provide driving force generated using the magnetic force by being installed even in a limited space of other devices.

In addition, the driving part can be easily assembled as compared with the conventional art in which the driving part is bonded after a wire is wound.

The design difficulty of the actuator can be reduced as compared with the conventional actuator formed in an asymmetric slip type.

In addition, the driving part of the inventive actuator can be designed to be slimmer as compared with that of the asymmetric slip type.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An actuator comprising:
a focusing-substrate having four sides, a top surface, and a bottom surface, wherein the top and bottom surfaces are provided with a focusing coil pattern for generating focusing driving force, the focusing-substrate being provided with a land part and a hole through which laser beams pass;
an object lens for transmitting the laser beams;
a blade for holding the object lens, the focusing substrate being fixed on a bottom of the blade;
wire attaching parts formed on opposite sides of the blade and connected to the land part;
a printed circuit board for applying external current to the focusing coil pattern;
wires having a first end fixed on the wire attaching parts and a second end fixed on the printed circuit board;
tracking coils for generating tracking driving force by receiving current from the printed circuit board, the tracking coils being wound around two opposite sides and the top and bottom surfaces of the focusing substrate on opposite sides of the focusing substrate so that the length of the tracking coils is parallel with the wire direction;
magnets for providing magnetic force to the focusing coil pattern and the tracking coils; and
a yoke plate provided with a pair of first yokes for fixing the magnets and a second yoke for fixing the printed circuit board.

2. The actuator of claim 1, wherein the focusing coil pattern is formed of a coil patterned in a spiral shape on the focusing-substrate.

3. The actuator of claim 1, wherein the focusing coil pattern is formed of first and second coils that are patterned in a spiral shape on the focusing-substrate at both sides of the hole.

* * * * *